(12) United States Patent
Mao et al.

(10) Patent No.: US 9,927,577 B2
(45) Date of Patent: Mar. 27, 2018

(54) 2×2 WAVELENGTH SELECTIVE SWITCH ARRAY

(71) Applicant: Oplink Communications, LLC, Fremont, CA (US)

(72) Inventors: Hongwei Mao, Fremont, CA (US); Lifu Gong, San Jose, CA (US); Gongjian Hu, Marina, CA (US); Guijun Ji, Cupertino, CA (US); Tian Zhu, Castro Valley, CA (US); Kun Lu, Sunnyvale, CA (US)

(73) Assignee: Oplink Communications, LLC, Fremont, CA (US)

( * ) Notice: Subject to any disclaimer, the term of this patent is extended or adjusted under 35 U.S.C. 154(b) by 0 days.

(21) Appl. No.: 15/450,766

(22) Filed: Mar. 6, 2017

(65) Prior Publication Data

US 2017/0176687 A1 Jun. 22, 2017

Related U.S. Application Data

(62) Division of application No. 14/167,831, filed on Jan. 29, 2014, now Pat. No. 9,588,299.

(51) Int. Cl.
*G02B 6/35* (2006.01)
*G02B 6/293* (2006.01)
*H04Q 11/00* (2006.01)
*G02B 6/27* (2006.01)

(52) U.S. Cl.
CPC ......... *G02B 6/356* (2013.01); *G02B 6/2706* (2013.01); *G02B 6/29311* (2013.01); *G02B 6/3518* (2013.01); *G02B 6/3546* (2013.01); *G02B 6/3554* (2013.01); *G02B 6/3592* (2013.01); *H04Q 11/0005* (2013.01);
(Continued)

(58) Field of Classification Search
CPC ...................................................... G02B 6/356
See application file for complete search history.

(56) References Cited

U.S. PATENT DOCUMENTS

| 5,414,540 A | 5/1995 | Patel et al. |
| 6,285,500 B1 | 9/2001 | Ranalli et al. |
| 6,330,102 B1 | 12/2001 | Daneman et al. |

(Continued)

FOREIGN PATENT DOCUMENTS

WO    WO 03/032071 A1    4/2003

*Primary Examiner* — Daniel Petkovsek
(74) *Attorney, Agent, or Firm* — Bo Huang

(57) ABSTRACT

Methods, systems, and apparatus for optical wavelength selective switching. One 2×2 wavelength selective switch array includes a plurality of optical input ports configured to receive one or more optical input beams, and a plurality of optical output ports configured to receive one or more one or more optical output beams wherein the plurality of optical input ports and optical output ports form an array of 2×2 optical port pairs; one or more optical conditioning and wavelength dispersion elements; a polarization modulator array having a plurality of polarizing modulation cells, each cell configured to independently change a polarization orientation of an optical beam passing through the cell and associated with a particular wavelength channel; and a polarization-selective beam-routing optical element configured to route each particular input beam to either a first output port or a second output port according to polarization orientation.

6 Claims, 5 Drawing Sheets

(52) U.S. Cl.
CPC ...... *G02B 6/351* (2013.01); *H04Q 2011/0026* (2013.01); *H04Q 2011/0035* (2013.01)

(56) References Cited

U.S. PATENT DOCUMENTS

| | | | |
|---|---|---|---|
| 6,360,037 | B1 | 3/2002 | Riza |
| 6,560,000 | B2 | 5/2003 | Iyer et al. |
| 6,603,898 | B2 | 8/2003 | Doerr |
| 7,468,840 | B2 | 12/2008 | Cohen et al. |
| 7,653,308 | B2 | 1/2010 | Miyazaki et al. |
| 7,777,957 | B2 | 8/2010 | Sakurai et al. |
| 8,000,568 | B2 | 8/2011 | Presley et al. |
| 8,023,825 | B2 | 9/2011 | Gerstel et al. |
| 9,588,299 | B2 * | 3/2017 | Mao ................... G02B 6/29311 |
| 2004/0179279 | A1 * | 9/2004 | Kawahata .......... G02B 6/29358 359/833 |
| 2010/0067912 | A1 | 3/2010 | Khan |
| 2010/0172646 | A1 | 7/2010 | Colbourne |

* cited by examiner

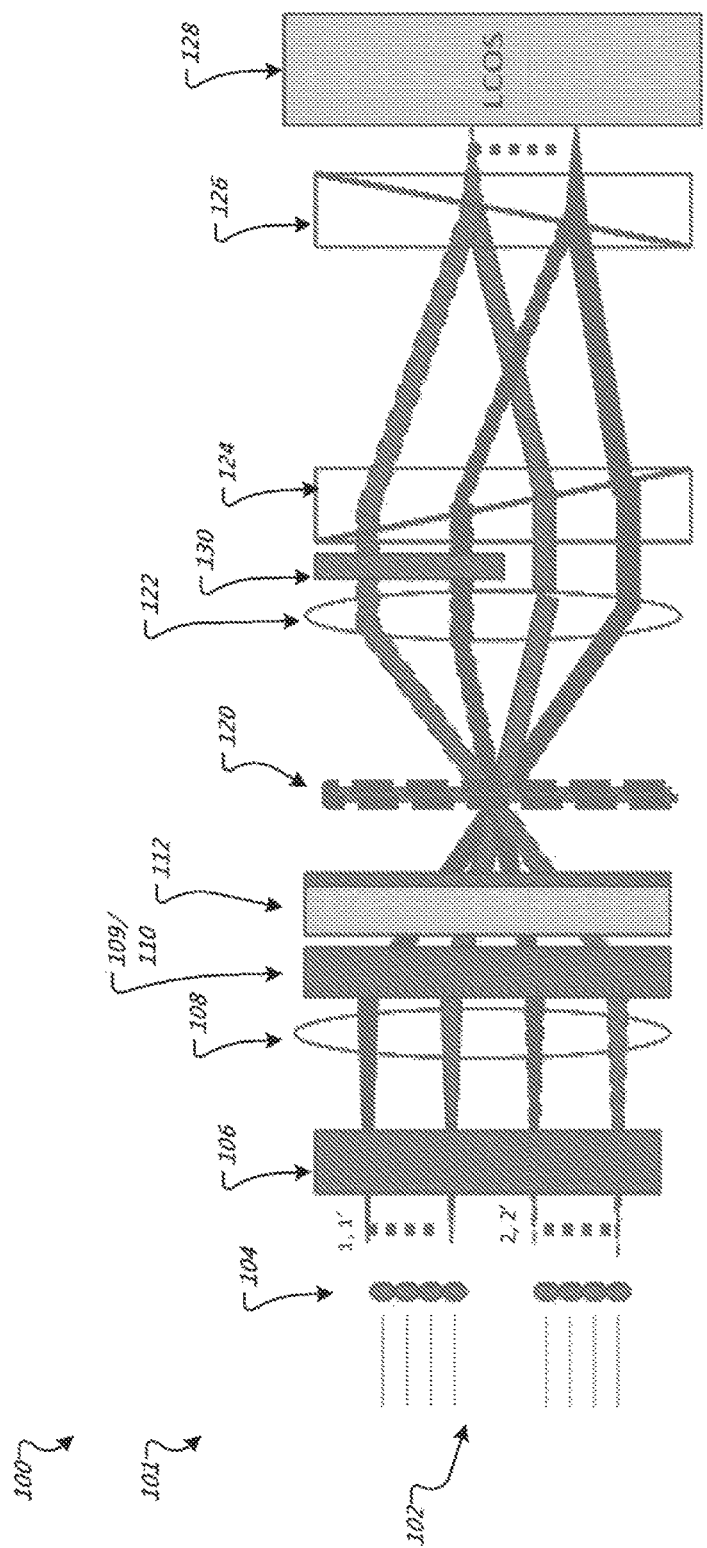

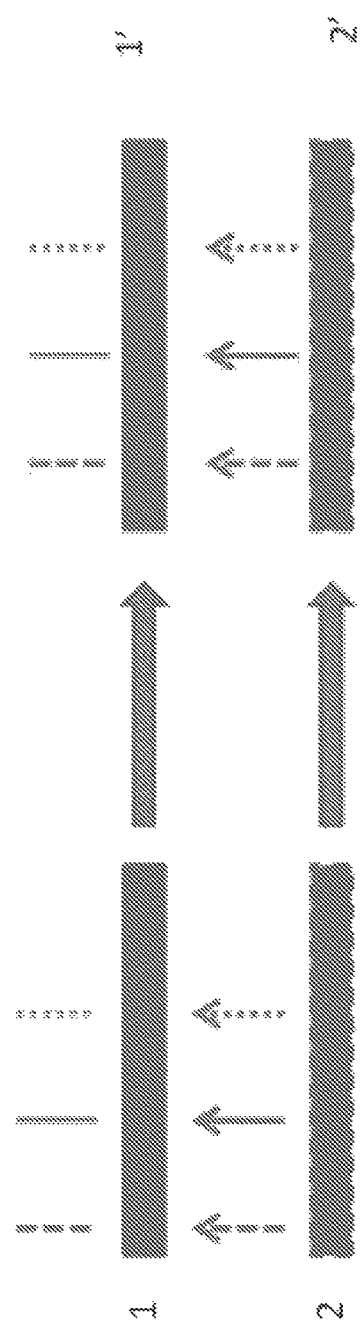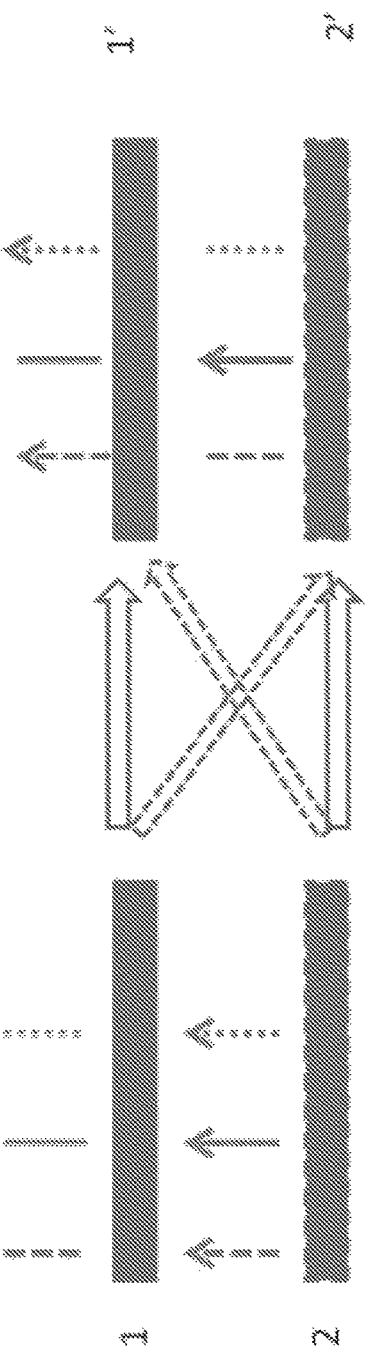

2×2 WAVELENGTH SELECTIVE SWITCH ARRAY

REFERENCE TO RELATED APPLICATIONS

This patent application is a divisional of U.S. Ser. No. 14/167,831, currently U.S. Pat. No. 9,588,299 B2, filed 29 Jan. 2014, which is fully incorporated by reference in its entirety.

BACKGROUND

This specification relates to optical wavelength selective switching.

Optical wavelength selective switches are typically used in optical communication systems. An optical wavelength selective switch is a switch that enables optical signals with arbitrary wavelengths in, e.g., optical fibers, to be selectively switched from one optical fiber to another. A conventional wavelength selective switch is typically used for wavelength selective reconfigurable optical ADD/DROP nodes, (optical transparent router), that include structures for switching optical signals on a per wavelength basis. Optical wavelength selective switches are typically used in the optical fiber communication industries, instrument industries, and defense industries.

SUMMARY

In general, one innovative aspect of the subject matter described in this specification can be embodied in 2×2 wavelength selective switch arrays that include multiple optical input ports configured to receive one or more optical input beams, each of the one or more input optical beams having one or more wavelength channels, and multiple optical output ports configured to receive one or more one or more optical output beams each having one or more wavelength channels based on a switching state, wherein the multiple optical input ports and optical output ports form an array of 2×2 optical port pairs each including a pair of optical input ports and a pair of optical output ports; an optical assembly having optical power to convert input beams into collimated beams; one or more optical conditioning and wavelength dispersion elements configured to align the optical beams into a common polarization direction and to separate the respective wavelength channels of the one or more input optical beams traveling in a first direction and to combine two or more separate optical beams having different wavelength channels into particular output beam; an optical assembly including a focusing optic element having optical power to focus the input beams onto polarization modulator array, the polarization modulator array having multiple polarizing modulation cells, each cell configured to independently change a polarization orientation of an optical beam passing through the cell and associated with a particular wavelength channel of a particular 2×2 switch; and one or more polarization-selective beam-routing optical elements configured to route each particular input beam to either a first output port or a second output port of a corresponding 2×2 optical port pair according to polarization orientation.

The foregoing and other embodiments can each optionally include one or more of the following features, alone or in combination. The 2×2 wavelength selective switch array further includes one or more optical conditioning elements including a polarization conditioning assembly coupled to a collimating optical element and a half wave plate such that input light beams having a random polarization become light beams having a common polarization. The optical fibers are optically coupled to a microlens array positioned substantially at a back focus plane of the collimating optical element. A grating is optically coupled between the collimating optic element and the focusing optic element and wherein the grating is located at the front focus plane of collimating optic element, and the back focus plane of the focusing optic element. The one or more wavelength dispersion elements include a grating for separating incident light beams according to wavelength channel. The one or more polarization selective beam routing optical elements a first and second Wollaston prism optically coupled between the polarization modulator array and the focusing optic element. The focusing optic element is optically coupled between the grating and the first Wollaston prism in the polarization selective beam routing assembly such that a grating coupled between a collimating optical assembly and the focusing optic assembly is positioned at a back focus plane of the focusing optic element and the polarization modulator array is positioned at a front focus plane of the focusing optic element. Each 2×2 optical port pair forms part of an independent 2×2 wavelength selective switch, wherein the 2×2 wavelength selective switch routes wavelength channels of the input optical beams at the first pair of optical input ports to one of the pair of optical output ports according to a switching state of the 2×2 wavelength selective switch.

In general, one innovative aspect of the subject matter described in this specification can be embodied in systems that include multiple optical fibers optically coupled to a microlens array; a collimating optical element; a polarization conditioning assembly optically coupled between the microlens array and a collimating optic element; a beam parallelism correction Wollaston prism optically coupled between the collimating optic element and a free space circulator assembly; a grating optically coupled between the free space circulator assembly and a focusing optic element; and a first Wollaston prism and a second Wollaston prism optically coupled between the focusing optic element and a polarization modulator array.

The foregoing and other embodiments can each optionally include one or more of the following features, alone or in combination. The polarization conditioning assembly includes a polarization beam separation Wollaston prism and half wave plate. The free space circulator assembly includes a polarization beam splitter, a garnet material, and a wave plate. The multiple optical fibers includes multiple optical input ports configured to receive one or more input optical beams, each of the one or more input optical beams having one or more wavelength channels, and multiple optical output ports configured to receive one or more wavelength channels based on a switching state, wherein the multiple optical input ports and optical output ports form an array of 2×2 optical port pairs each including a pair of optical input ports and a pair of optical output ports. Each 2×2 optical port pair forms part of an independent 2×2 wavelength selective switch, wherein the 2×2 wavelength selective switch routes wavelength channels of the input optical beams at the first pair of optical input ports to one of the pair of optical output ports according to a switching state of the 2×2 wavelength selective switch. The polarization modulator array includes multiple polarizing modulation cells, each cell configured to independently change a polarization orientation of an optical bema passing through the cell and associated with a particular wavelength channel of a particular 2×2 wavelength selective switch.

In general, one innovative aspect of the subject matter described in this specification can be embodied in methods for optical switching that include receiving one or more optical beams at each of one or more 2×2 switches of an array of 2×2 wavelength selective switches, each optical beam including multiple wavelength channels; for the one or more optical beams received at each 2×2 switch: conditioning the one or more optical beams to have a common polarization direction; separating the one or more optical beam according to wavelength into individual wavelength optical beams; directing each wavelength to a separate cell of a polarization modulator array, wherein each cell is selectively activated to change the polarization orientation of an optical beam incident on the cell or to maintain the polarization orientation depending on a specified switching state; merging the separate wavelength optical beams into one or more optical output beams having a polarization direction based on the activation of the corresponding cells of the polarization modulator array, each output beam having one or more of the multiple wavelength channels; and routing each of the one or more output optical beams to a particular output port of the 2×2 switch.

Particular embodiments of the subject matter described in this specification can be implemented so as to realize one or more of the following advantages. In the 2×2 wavelength selective switch array described in this specification, multiple 2×2 wavelength selective switches can share a common set of optical components and a common set of the alignment procedures. All other switches can be auto-aligned as long as the first and the last switch of the array are aligned. The total cost of the device is minimized, and the overall size of the device is also minimized.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A is an example 2×2 wavelength selective switch array on a port switching plane.

FIG. 4A illustrates an example switching diagram for a 2×2 wavelength selective switch in a first switch state.

FIG. 4B illustrates an example switching diagram for the 2×2 wavelength selective switch in a second switch state.

Like reference numbers and designations in the various drawings indicate like elements.

DETAILED DESCRIPTION

Figure 1B:
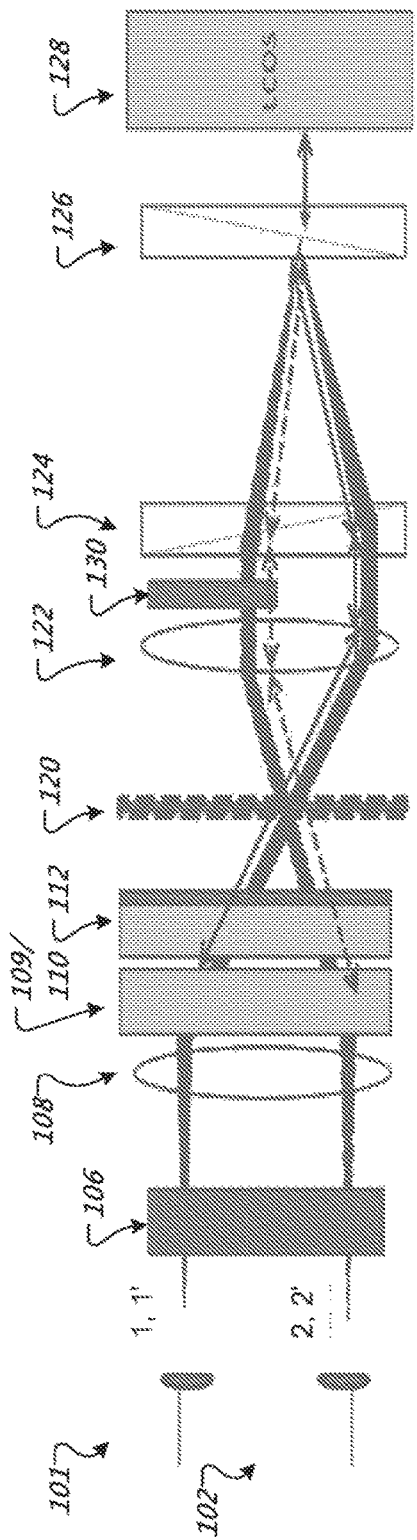
FIG. 1B is an example of the 2×2 wavelength selective switch array in a first switching state.

FIG. 1A is a diagram 100 of an example 2×2 wavelength selective switch array 101 in a port switching plane. FIG. 2 is a diagram 200 of the example 2×2 wavelength selective switch array 101 on a wavelength dispersion plane. In particular, the 2×2 wavelength selective switch array 101 provides an array of independently operated 2×2 wavelength selective switches. The optical arrangement of the 2×2 wavelength selective switch array 101 provides common optics for wavelength selective beam path routing so that each wavelength channel follows a programmable path through the optical components depending on a switch state of corresponding pixels of a two-dimensional polarization modulator array of each 2×2 wavelength selective switch. The optical arrangement of the 2×2 wavelength selective switch array 101 is configured to be telecentric in both a port switching plane and a wavelength dispersion plane. This allows an array of fiber ports to share the common set of the alignment procedures for the 2×2 wavelength selective switch array 101. As described in detail below, particular components are positioned at a respective back focus plane or front focus plane of focusing or collimating lenses as part of the telecentric configuration.

The 2×2 wavelength selective switch array 101 includes multiple optical fibers 102 optically coupled to a microlens array 104. The microlens array 104 is optically coupled to a Wollaston prism 106. After the microlens array 104, the input Gaussian beam waist size is converted to around 60-70 µm so that the beam divergence angle is reduced to a proper value and can be easily handled by the Wollaston prism 106 for polarization beam angular separation. In particular, the multiple optical fibers 102 include multiple 2×2 pairs of optical input fibers and optical output fibers. For example, a 2×2 pair of fibers can include input fibers 1 and 2 and output fibers 1' and 2'. Each 2×2 pair of optical fibers can be used to form a 2×2 wavelength selective switch. Consequently, the multiple optical fiber pairs are used to form N 2×2 wavelength selective switches.

Each of the input and output optical fibers is optically coupled to the microlens array 104. The microlens array 104 is an array of small diameter lenses formed in an array on a supporting substrate. The microlens array 104 is for input Gaussian beam waist conversion. It is configured such that input light from any one of the optical input fibers is aligned simultaneously and directed to a particular portion of the Wollaston prism 106 for polarization beam angular separation. Similarly, the microlens array 104 is configured such that output light passing through the array is focused on particular optical fibers of the optical output fibers. Each optical input port can input a light beam having one or more wavelength channels.

The incoming light beams from the optical input fibers can have random polarizations. Therefore, polarization condition is performed by the polarization conditioning assembly, which is a combination of a polarization angular separation provided by the Wollaston prism 106, an angular correction provided by a Wollaston prism 109 and a 45 degree cut half-wave plate 110. The Wollaston prism 106 separates incoming light into two orthogonal linearly polarized beams that diverge at a specified angle from each other. Furthermore, the Wollaston prism 106 is configured to provide the polarization separation along the wavelength dispersion plane.

The Wollaston prism 106 is coupled to a main collimating lens 108. The main collimating lens 108 is configured to align incoming light so that the Gaussian beam size is expanded to 2-5 mm and to further reduce the beam divergence angle. On the port switching plane shown in FIG. 1A, after the main collimating lens 108, all the input beams are collimated and crossed at its front focus plane. Additionally, the microlens array 104 (FIG. 1) is configured to be positioned at a back focus plane of the main collimating lens 108.

On the color dispersion plane shown in FIG. 2, after the main collimating lens 108, all of the polarized beams separated by the Wollaston prism 106 from all the input fibers 102 are collimated and bended into be substantially parallel. On color dispersion plane, the main collimating lens 108 is unable to completely correct the incoming light beams with different polarizations to be parallel to each other because of the positioning of Wollaston prism 106 relative to the collimating lens 108. In particular, Wollaston prism 106 cannot be positioned exactly at a back focus plane of the collimating lens 108. Thus, further correction is needed.

The main collimating lens 108 is optically coupled to a correction Wollaston prism 109 and a half-wave plate 110. The Wollaston prism 109 and half-wave plate 110 are configured to receive the separated orthogonally polarized substantially collimated light beams from the collimating lens 108 and further correct them into parallel beams with the same polarization. The Wollaston prism 109 has a small birefringence that further corrects cross angle between two separated polarized beams received from main collimating lens 108. The half-wave plate 110 is configured to cover only a portion of the light paths such that only a light beam having a first polarization is incident on the wave plate. The second orthogonally polarized light beam is not incident on the half-wave plate 110. The light that is incident on the half-wave plate 110 has a polarization rotated by 90 degrees upon exiting the half-wave plate 110. As a result, the light from the main collimating lens 108 exits the Wollaston prism 109 and half-wave plate 110 as parallel light beams having the same polarization.

The Wollaston prism 109 and half-wave plate 110 combination is optically coupled to a free-space circulator assembly 112. The free-space circulator assembly 112 includes a polarization beam splitter ("PBS") 114, a garnet material 116, and a wave plate 118. The PBS 114 passes light beams having a second polarization while reflecting beams having an orthogonal polarization. In particular, the PBS 114 can be formed of two prisms joined at an angle such that light beams having a second polarization passes directly through the PBS 114 while light beams having the orthogonal polarization are directed based on the angle at which the two prisms are joined.

In particular, the light beams entering the PBS 114 from the Wollaston prism 109 and half-wave plate 110 have the same polarization direction and therefore pass through the PBS 114. In a forward propagation direction, Garnet material 116 will rotate the polarization direction of input beam by +45 degree, and c-axis 22.5 degree cut half-wave plate 118 will rotate the polarization direction by −45 degree, the exiting light beams have a polarization rotation rotated by 0 degree in total. However in a backward direction, the garnet material 116 rotates the polarization direction of the light beams by +45 degrees. The wave plate 118 further rotates the polarization direction by another +45 degrees. Thus, the exiting light beams have a polarization direction rotated by 90 degrees in total. The rotation angle of the Garnet material 116 depends only on the direction of magnetic field. As such, the combination of PBS, Garnet, and half wave plate provides a polarization beam routing device that is dependent on beam propagation direction.

The free-space circulator assembly 112 is optically coupled to a grating 120. The grating 120 separates the input light beams from the free-space circulator assembly 112 according to wavelength such that each wavelength follows a distinct path (e.g., a particular angle from the grating). The grating 120 can be a diffraction grating that splits and diffracts light into several light beams travelling in different directions. The directions of these light beams depend on the spacing of the grating 120 and the wavelength of the light so that the grating 120 acts as the dispersive element separating the different wavelength channels of the input light beams.

The grating 120 is optically coupled to a focusing lens 122. After passing through the focusing lens 122, the angular separation of the beams with different wavelengths will be converted into a spatial position separation on the front focus plane where a polarization modulation array 128 is positioned. Consequently, the polarization states of each wavelength beam can be modulated independently.

In particular as shown by the telecentric configuration (FIG. 1), the grating 120 is positioned at the back focus plane of the focusing lens 122, additionally, the grating 120 is positioned at the front focus plane of the main collimating lens 108. A pair of Wollaston prisms 124, 126 are optically coupled between the focusing lens 122 and the polarization modulation array 128, for beam path switching between input and output ports.

The input collimated beams from the main collimating lens 108 are crossed at the position of the grating 120 and travel to the focusing lens 122. After the focusing lens 122, the beams from the input ports (fibers) 102 are passed through port switching optics 124, 126, and 130 and focused onto the polarization modulation array 128. On the port switching plane, only the beams from bottom ports, e.g., fiber 2, 2', will pass through half-wave plate 130 and receive a 90 degree polarization direction rotation. After passing through the focusing lens 122 the beams of upper input ports e.g., fiber 1, will be bent and pass through the bottom path (as shown in FIG. 1A), and the beam of bottom input ports, e.g., fiber 2, will pass through the top path and pass through half-wave plate 130. The polarization directions of all bottom input fibers will rotate by 90 degree after passing through the half-wave plate 130. After the half-wave plate 130, the polarization direction of upper input ports and bottom input ports are orthogonal. Passing through Wollaston prisms 124 and 126, the two orthogonal polarized beams from input ports 1 and 2 will be combined on the polarization modulation array 128 and form a single focused spot having the same wavelength channel. On the port switching plane, the optical layout is a typical 4f telecentric configuration, different input ports of each individual 2×2 switches are mapped onto separate locations with different rows corresponding to different switches and different column corresponding to different wavelength channels on the polarization modulation array 128.

Figure 3:
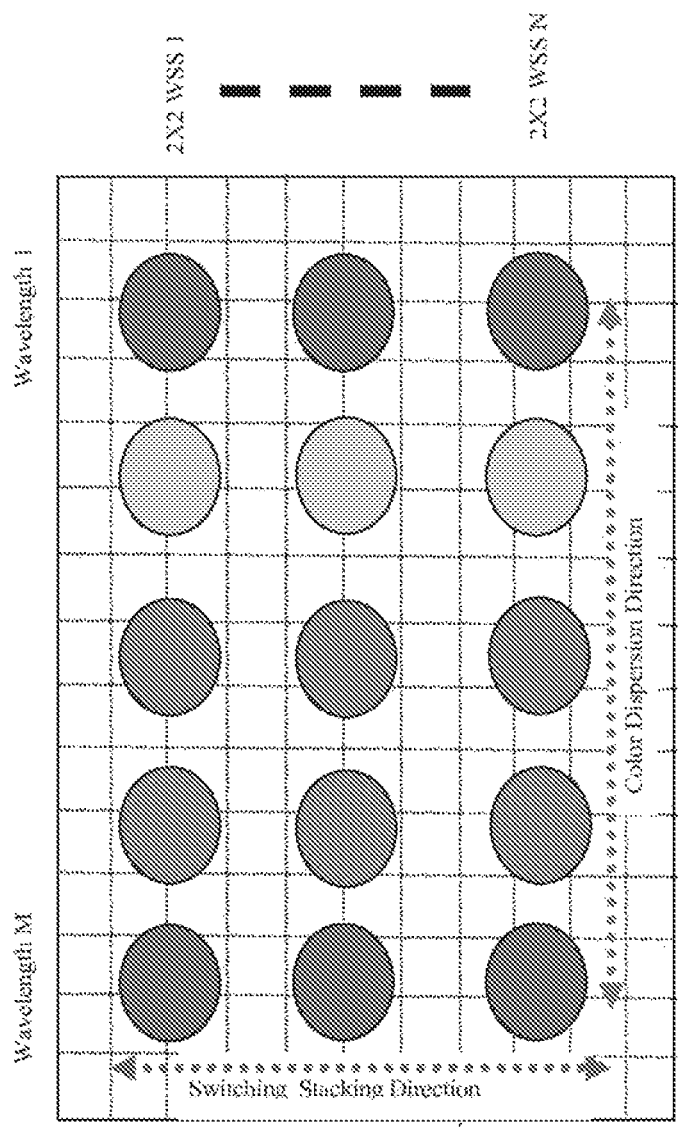
FIG. 3 shows a graphical illustration of beam spot distribution on the two-dimensional polarization modulator array of the example 2×2 wavelength selective switch array of FIGS. 1-2.

This is illustrated by FIG. 3 showing a graphical illustration 300 of beam spot distribution on the two-dimensional polarization modulator array of the example 2×2 wavelength selective switch array with respect to the switching stacking direction and the color dispersion direction for multiple 2×2 switches.

The polarization modulator array 128 can be a liquid crystal cell array that includes a number of separate polarizing modulation cells e.g., pixel cells. Each pixel can be independently controlled such that the pixel either rotates the polarization orientation of light incident on the pixel (e.g., by 90 degrees) or does not change the polarization. For example, electric voltage though a particular cell can cause alignment of the liquid crystal. Whether polarization is rotated or not can depend on whether the liquid crystal is aligned. In addition to a liquid crystal array, the polarization modulator array 128 can also be a thin film transistor liquid crystal panel or a liquid crystal on silicon.

Each polarizing modulation cell of the polarization modulator array 128 can be designed to provide polarization control for a specific wavelength channel of a specific 2×2 switch. As such, the polarization modulator array 128 can be configured to independently control the polarization state of each individual wavelength according to the desired combination of wavelengths at each specific 2×2 switch. For example, for a particular desired routing of wavelengths, the polarization modulator array 128 can be programmed to produce particular polarizations of the wavelengths to achieve a desired output port routing for each of the N 2×2 wavelength selective switches.

In a specific 2×2 switch with two input ports 1 and 2 and two output ports 1' and 2', such as shown in the example, when the forward propagated input light beams (from input fiber 1 and fiber 2 which are combined into one location on the polarization modulator array 128) hit on the segment of polarization modulator array 128. The pixels on the segment are programmed to provide no polarization rotation then the two orthogonally polarized beams will keep the polarization unchanged and be retro-reflected back to Wollaston prisms 126 and 124. The two backward propagated beams follow the same beam path as their forward propagation direction all way down to the free space circulator assembly 112 (FIG. 1). The polarization direction of backward propagated beam will be rotated by 90 degree after passing through the half-wave plate 118 and the Garnet material 116. Then the backward propagated beam will be routed into a new beam path which is on the same location as the input port on the port switching plane but shifted in space along color dispersion plane. As a result, the input 1 is routed to output 1' and input 2 is routed to output 2'.

Figure 2:
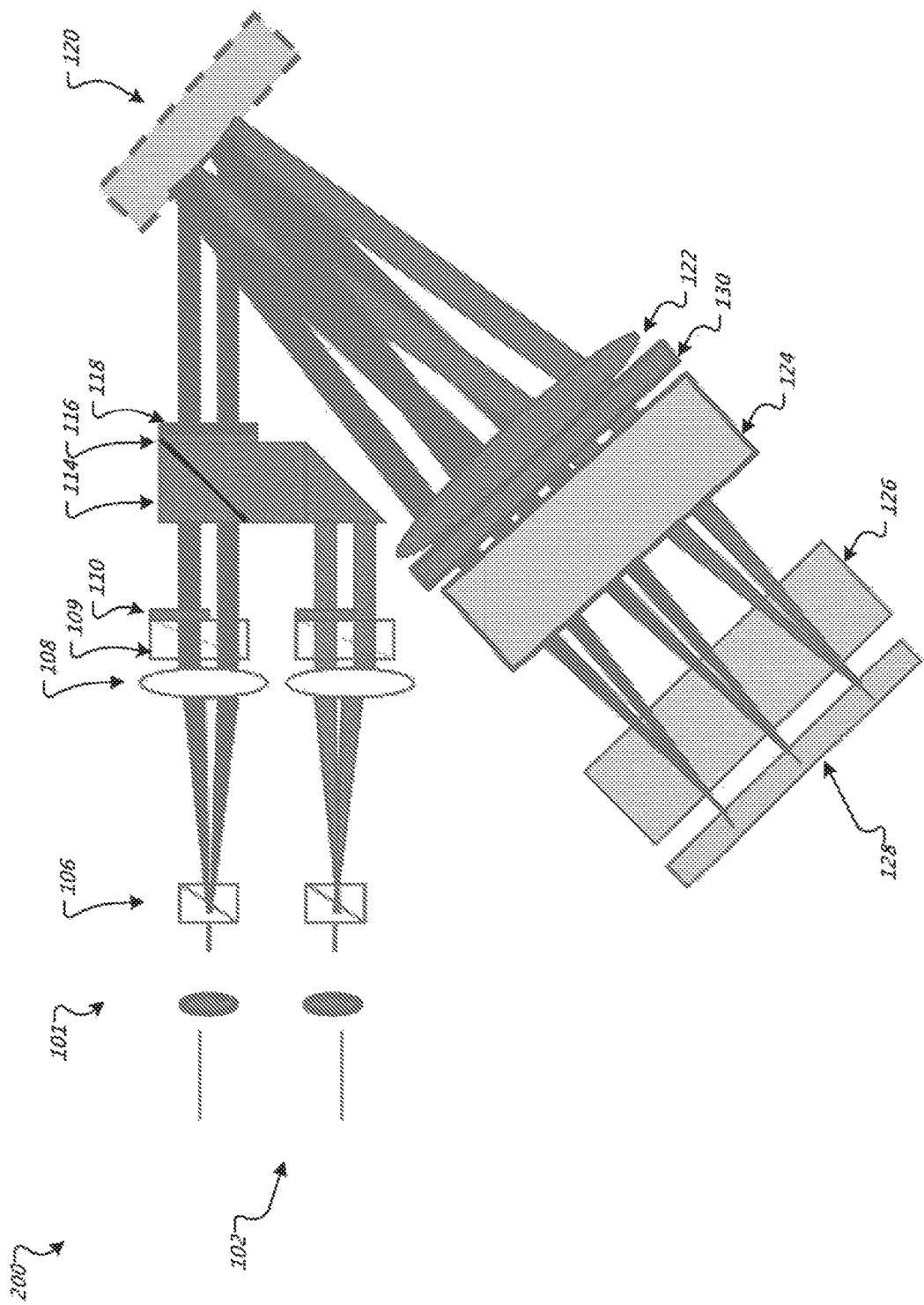
FIG. 2 is an example of the 2×2 wavelength selective switch array on a wavelength dispersion plane.

FIG. 1B is an example of the 2×2 wavelength selective switch array 101 in a first switching state. In particular, FIG. 1B illustrates the light paths though the 2×2 wavelength selective switch array 101. Light entering input 1 is output back at output 1' and light entering at input 2 is routed to output 2'.

In an alternative switching setting, pixels on the segment of polarization modulation array 128 are programmed to be 90 degree polarization rotation. Then the orthogonally polarized input beams will exchange their polarization directions. After the polarization modulator array 128, the beams are reflected back to the Wollaston prisms 126 and 124. Since the polarization directions are rotated by 90 degree after the reflection, then the propagation paths of the beams from input fiber 1 and 2 are swapped among Wollaston prism 126 and 124 in the backward direction. That means that in the backward direction, from thee Wollaston prism 126 all the way to the free space circulator assembly 112, the beam from input 1 will backward propagated along the forward beam path of input 2, meanwhile the beam from input 2 will backward propagated along forward beam path of input 1. As a result, the input 1 is routed to output 2' and input 2 is routed to output 1'.

Figure 1C:
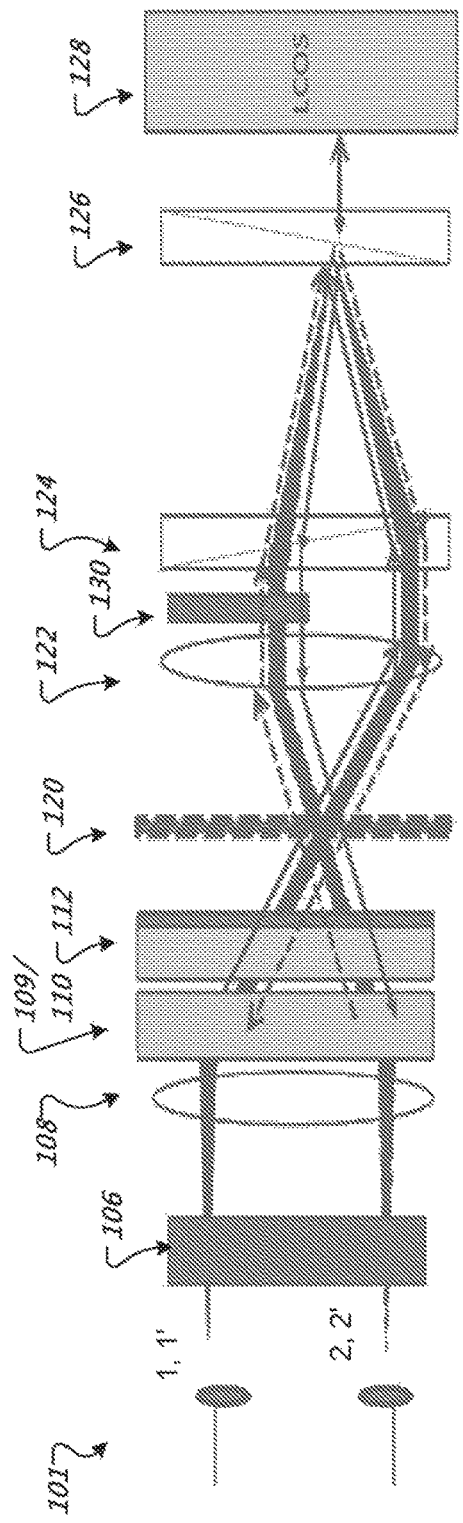
FIG. 1C is an example of the 2×2 wavelength selective switch array in a second first switching state.

FIG. 1C is an example of the 2×2 wavelength selective switch array 101 in a second switching state. In particular, FIG. 1C illustrates the light paths though the 2×2 wavelength selective switch array 101. Light entering input 1 is output back at output 2' and light entering at input 2 is routed to output 1'.

On the color dispersion plane (FIG. 2), and in a backward direction, light beams having different wavelengths are recombined into one particular output beam after the grating 120, since the dispersion is cancelled out by the return trip through the grating 120. However, the different wavelengths in the polarization switched beams have a polarization associated with the corresponding back end liquid crystal cell pixel of the polarization modulator array 128 and are therefore routed along a different path on the port switching plane than the input beam due to the pair of Wollaston prisms 124 and 128. Light beams corresponding to the wavelengths that are not switched by the polarization modulator array 128 follow an optical return path similar to the input path but with some displacement on the color dispersion plane that aligns them with corresponding output ports.

In backward direction, the light beams follow a path from the grating into the free-space circulator assembly 112 where the polarizations are rotated by 90 degrees by the combination of the half wave plate 118 and garnet material 116. The free-space circulator assembly 112 routes the backward propagated input beams to the output ports that are shifted in space along color dispersion plane. Forward propagated input beam having a first polarization direction that can pass through the PBS 114 while the backward propagated beams having a polarization in a second direction are directed along a second path out of the PBS 114, back through the collimating lens 108 and polarization recombined by the Wollaston prism 106 to be output to particular optical fibers 102.

Multiple 2×2 wavelength selective switches are stacked along port switching plane in a 4f telecentric configuration such as that illustrated by FIG. 1; where the beams from different individual switches are crossed at the plane of the grating 120. The beam paths on the color dispersion plane for each switch are all alike.

As an example, a first 2×2 switch of the N 2×2 switch array can have input ports 1 and 2. A first switch state routes all the wavelengths from input port 1 to output port 1' and all the wavelengths from input port 2 to output port 2'. A second switch state routes a particular group of wavelengths from input port 1 to output port 2' and a particular group of wavelengths form input port 2 to output port 1', routes another particular group of wavelengths from input port 1 to output 1' and another particular group of wavelength from input port 2 to output 2'. Each particular wavelength is labeled with a featured line in FIGS. 4A-B described below. The path for the 2×2 switch swaps output paths depending on the settings of the polarization modulator 128.

Continuing the example, input light at input port 1 has a first wavelength and input light at input port 2 has a second wavelength. In the first switch state, the polarization modulator array 128 does not change the polarization of for pixel cells corresponding to the first wavelength and the second wavelength beams. As a result, the light beam of the first wavelength follows a return path that is similar to the input path but offset to direct the light beam to the output port 1'. Similarly, the light beam of the second wavelength follows a return path that is similar to the input path but offset to direct the light beam to the output port 2'.

However, in the second switch state, the polarization modulator 128 does change the polarization of for pixel cells corresponding to the first wavelength and the second wavelength beams. As a result, the light beam of the first wavelength follows a return path that is swapped by the Wollaston 126 and 124, directing the light beam of the first wavelength along an output path to the output port 2'. Similarly, the light beam of the second wavelength follows a return path that is swapped by the Wollaston 126 and 124, directing the light beam of the second wavelength along an output path to the output port 1'.

Each 2×2 switch pair can be associated with light beams having distinct wavelengths. Furthermore, each 2×2 switch pair can be independently controlled to a particular switch state using the polarization modulator array 128. Thus, the switch states of each of the N 2×2 switch pairs are independent.

Additionally, each input port can input a light beam having more than one wavelength channel. Each wavelength can be controllably routed to a respective output port such that the output light beams can have different combinations of wavelengths. For example, the light beam input to input port 1 can have wavelengths $\square_1$ and $\square_2$. Based on the settings of the polarization modulator array 128, wavelength $\square_1$ can be routed to output port 1' and wavelength $\square_2$ can be routed to output port 2', or vice versa.

An example of various output port switching is shown in FIGS. 4A-4B. FIG. 4A illustrates an example switching diagram for a 2×2 wavelength selective switch 400 in a first switch state. The 2×2 switch 400 includes a first input port 1, a second input port 2, a first output port 1', and a second output port 2'. Light beams input to first input port 1 include three wavelength channels having wavelengths $\square_1$, $\square_2$, and $\square_3$. Light beams input to second input port 2 include three wavelength channels having wavelengths $\square_4$, $\square_5$, and $\square_6$. In the first switch state, each of the wavelengths, $\square_1$, $\square_2$, and $\square_3$, input to the first input port 1 are directed to be output at the first output port 1'. Similarly, each of the wavelengths, $\square_4$, $\square_5$, and $\square_6$, input into the second input port 2 are directed to be output at the second output port 2'.

FIG. 4B illustrates an example switching diagram for the 2×2 wavelength selective switch 400 in a second switch state. In the second switch state, the polarization modulator is configured such that some of the wavelength channels have a rotated polarization that results in them being switched from the respective output ports of the first switch state. In the example shown in FIG. 4B, the first output port 1' receives wavelengths $\square_4$, $\square_2$, and $\square_6$. Thus, while the wavelength channel corresponding to $\square_2$ remains directed to the first output port 1', the wavelength channels corresponding to $\square_4$ and $\square_6$ are switched from being output to the second output port 2' to the first output port 1'.

Similarly, the first output port 2' receives wavelengths $\square_1$, $\square_5$, and $\square_3$. Thus, while the wavelength channel corresponding to $\square_5$ remains directed to the second output port 2', the wavelength channels corresponding to $\square_1$ and $\square_3$ are switched from being output to the first output port 1' to the second output port 2'.

For example, in the second switching state, the polarization modulator can rotate the polarization by 90 degrees for wavelengths $\square_1$, $\square_3$, $\square_4$, and $\square_6$ while keeping the polarization direction of the other wavelength channels unchanged. This rotation results in an optical path through the 2×2 wavelength selective switch array that routes the respective wavelength channels to the corresponding output ports, e.g., as described above with respect to FIGS. 1-2.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products. Particular embodiments of the subject matter have been described. Other embodiments are within the scope of the following claims.

What is claimed is:

1. A system comprising:
a plurality of optical fibers optically coupled to a microlens array;
a collimating optical element;
a beam parallelism correction Wollaston prism optically coupled between the microlens array and the collimating optical element;
a polarization conditioning assembly optically coupled between the collimating optical element and a free space circulator assembly, the polarization conditioning assembly comprising a half wave plate;
a grating optically coupled between the free space circulator assembly and a focusing optic element; and
a pair of Wollaston prisms optically coupled between the focusing optic element and a polarization modulator array.

2. The system of claim 1, wherein the polarization conditioning assembly includes a polarization beam separation Wollaston prism.

3. The system of claim 1, wherein the free space circulator assembly includes a polarization beam splitter, a garnet material, and a wave plate.

4. The system of claim 1, wherein the plurality of optical fibers include a plurality of optical input ports configured to receive one or more input optical beams, each of the one or more input optical beams having one or more wavelength channels, and a plurality of optical output ports configured to receive one or more wavelength channels based on a switching state, wherein the plurality of optical input ports and optical output ports form an array of 2×2 optical port pairs each including a pair of optical input ports and a pair of optical output ports.

5. The system of claim 4, wherein each 2×2 optical port pair forms part of an independent 2×2 wavelength selective switch, wherein the 2×2 wavelength selective switch routes wavelength channels of the input optical beams at the first pair of optical input ports to one of the pair of optical output ports according to a switching state of the 2×2 wavelength selective switch.

6. The system of claim 1, wherein the polarization modulator array includes a plurality of polarizing modulation cells, each cell configured to independently change a polarization orientation of an optical beam passing through the cell and associated with a respective wavelength channel of a 2×2 wavelength selective switch.

* * * * *